Oct. 30, 1951     T. A. DEVINE     2,572,915
SUN HOOD FOR REFLEX CAMERAS
Filed June 11, 1949
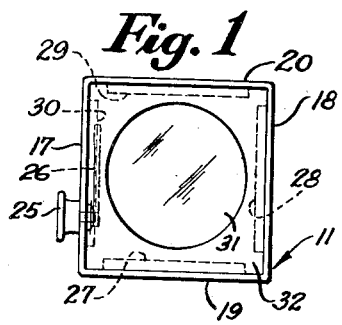
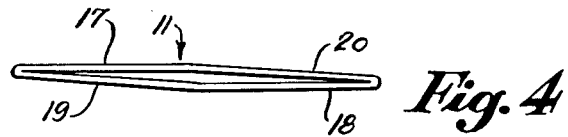
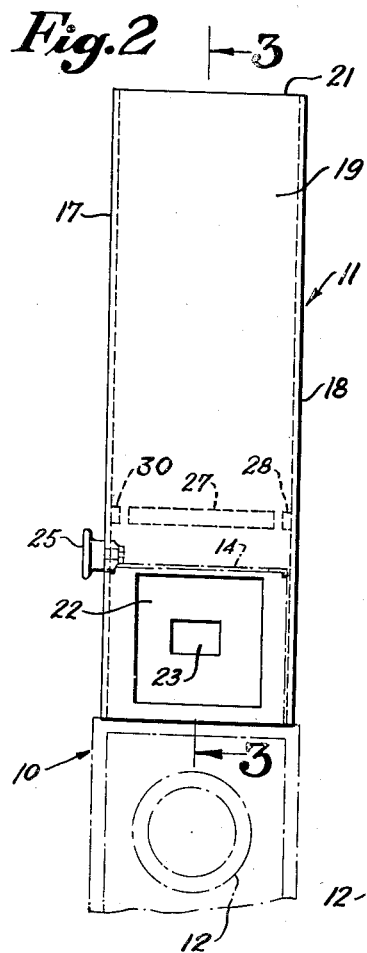
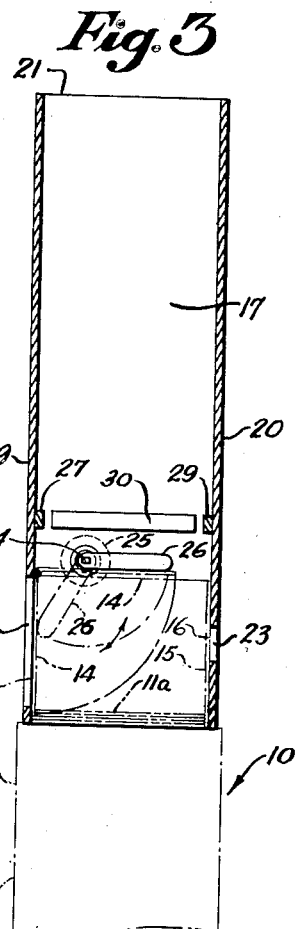
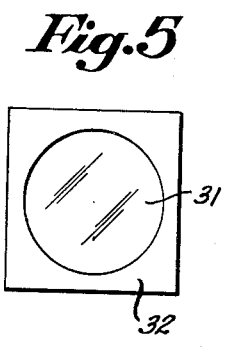
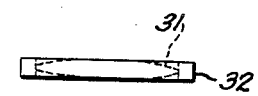
INVENTOR.
THOMAS A. DEVINE
BY
ATTORNEYS Patented Oct. 30, 1951

2,572,915

UNITED STATES PATENT OFFICE 2,572,915

SUN HOOD FOR REFLEX CAMERAS

Thomas A. Devine, Newark, N. J.

Application June 11, 1949, Serial No. 98,422

1 Claim. (Cl. 88—1.5)

This invention relates to improvements in sun hoods for focusing reflex cameras.

The reflex camera is equipped with a horizontal ground-glass finder in the top for viewing the image picked up by the lens so that the image may be properly positioned on the negative. To clarify the image on the ground-glass, use is made of a collapsible sun hood fixed to the camera around the ground-glass which reduces the light intensity. An opening in the front of the hood releasably covered by a door coacts with an opening in the back to provide a means for eye frame focusing when the door is raised. However, the height of the known collapsible sun hood and the amount of light excluded is limited by the size of the camera and design costs so that as supplied the light entering the open top of the fixed hood is insufficiently reduced to obtain the clarity of image desired in the ground-glass. To solve the problem, an auxiliary hood releasably fitted around the known hood when raised has been used. However, while such hoods have improved the image on the ground-glass over that obtained with the collapsible hood furnished by the manufacturers, it is always necessary to remove such auxiliary hoods when the photographer changes from eye frame focusing to ground-glass focusing.

It is an object of the instant invention to provide an auxiliary sun hood for reflex cameras which can be used for either eye frame or ground glass focusing without removing the auxiliary hood from the camera.

A further object is to provide an auxiliary sun hood which gives a more distinct ground-glass image than can be obtained by any known type hoods.

Still another object is to provide a means of obtaining better pictures with less effort than heretofore possible.

Other objects of the instant invention will become apparent in the course of the following specification.

In the accomplishment of these objectives, subject auxiliary sun hood is constituted of an elongated hollow body with open ends and having a cross section of suitable design for slip fitting over the known collapsible hood of the reflex camera when raised. An opening is formed in the front of the hood at the bottom which registers with the opening in the front of the known hood releasably covered by a door hinged along the upper edge. In the back of the auxiliary hood is another opening which registers with a similar opening in the corresponding member of the known hood so that with the eye in back of the smaller opening and the door of the known hood swung inwardly and upwardly it is possible to frame the object picked up by the lens in the larger opening at the front. Through one side of subject auxiliary hood at the bottom is a handle or wheel keyed to the end of a shaft rotatably passed through the side of the hood. On the inner end of the shaft one end of an inwardly curved arm is fastened and against which the door of the known hood presses when open so that without removing the auxiliary hood from the known hood the hinged door may be rotated inwardly and upwardly by the finger in the usual manner but closed by turning the wheel in a direction which will force the arm downwardly and swing the door downwardly and outwardly to close the opening in the known hood. The auxiliary sun hood may also be equipped with a lens removably and horizontally inserted therein above the previously mentioned openings in the front and back which maintains the auxiliary hood rigid in the expanded position and at the same time gives a sharper image in the ground-glass than possible with known equipment.

The invention will appear more clearly from the following detailed description when taken in conjunction with the accompanying drawings showing by way of example a preferred embodiment of the inventive idea.

In the drawings:

Figure 1 is a top view of the auxiliary sun hood constructed in accordance with the principles of this invention.

Figure 2 is a front elevational view of the sun hood shown in Figure 1 releasably attached to the open known sun hood of a reflex camera.

Figure 3 is a sectional view along 3—3 of Figure 2.

Figure 4 is an end view of the auxiliary sun hood in the collapsed position.

Figure 5 is a top view of the lens releasably inserted in the auxiliary sun hood to maintain the same rigid when extended and to clarify the image.

Figure 6 is an end view of the lens shown in Figure 5.

Referring now in greater detail to the drawings where like reference numerals indicate like parts, reference numeral 10 indicates a reflex camera, and 11 the auxiliary sun hood, the subject of this invention.

The known reflex camera 10 is supplied by the manufacturers with a collapsible sun hood 11a which is shown in the collapsed position by the double dot dash lines of Figure 3 and in the expanded position by the dot dash line of the same figure. In the front of the known sun hood, that is on the side of the lens 12, is an opening 13 releasably covered by a door 14 which is hinged along the upper edge of the opening 13 and designed to be swung inwardly and upwardly as shown by the dot dash line of Figure 3. Through the opposite member 15 of the known hood 11a is another opening 16 so positioned relative to the previously mentioned opening 13 when the door 14 is raised to the position shown in Figure 3 the object to be photographed can be framed in the opening 13 by sighting through the coacting opening 16.

The auxiliary sun hood 11 is constituted of a hollow body having the spaced parallel side members 17 and 18, the front member 19 spaced parallel from the back member 20, open top 21, and an open bottom. The horizontal cross section of the hollow body so formed is of suitable design to be slip fitted over the corresponding members of the known sun hood 11a when raised as most clearly shown in Figure 3. Any suitably rigid material may be used to form the hollow body and the spaced parallel members are hinged along corresponding edges by any suitable means so that the hollow body may be collapsible for transportation and storage as will be seen in Figure 4.

In the front of the hollow body of the auxiliary hood 11, that is the spaced parallel front member 19, is an opening 22 of such area and design that when the auxiliary hood 11 is fitted over the raised sun hood 11a, the opening 22 will register with the previously mentioned opening 13 of the known hood 11a. Through the spaced parallel back member 20 of the auxiliary hood 11 is an opening 23 which registers with the previously mentioned opening 16 of the known hood 11a.

Rotatably passed through the side member 17 of the auxiliary hood 11 is a shaft 24 (Fig. 3). On the outer end of the shaft 24, is the thumb wheel 25 keyed thereto by any known means. On the inner end of the shaft 24 is an arm 26, also keyed to the said shaft and flaring inwardly to the free end thereof. The shape of the arm 26 permits the door 14 to be swung inwardly and upwardly as shown in Figure 3 without blocking the line of vision when centering the object (not shown) in the opening 22. When the door 14 is rotated inwardly and upwardly as illustrated in Figure 3, the arm 26, the shaft 24, and the thumb wheel 25 will be rotated counterclockwise. Still viewing Figure 3, by turning the wheel 25 clockwise, the arm 26 will move in the same direction and carry the door 14 downwardly and outwardly to releasably close the opening 13. Thus, the opening and closing of the opening 13 by the door 14, a prerequisite when changing from ground-glass to eye frame focusing or conversely, is accomplished without removing the auxiliary hood 11 from the camera.

Within the hollow body of the auxiliary sun hood 11, are four horizontal brackets 27, 28, 29, and 30 in the same plane, and which are fastened to the inner surface portions of the hollow body by any suitable means for the releasable support of the later described lens 31. It will be noted in Figure 1, that the brackets do not extend for the full width of the spaced parallel members of the hood but rather terminate short of the corners which construction permits the body to be collapsed as shown in Figure 4. The distance of the upper edges of the brackets from the ground-glass (not shown) of the reflex camera 10 will vary, of course, with the characteristics of the lens 31 which serves for the clarification of the image in the ground-glass when viewed through the open top 21 of the auxiliary hood 11. The lens 31 is mounted in a frame 32, Figures 5 and 6, the outer periphery of the frame 32 being sufficient to permit insertion of the assembly through the open top 21, the lens carrying frame then being pushed downwardly to rest on the brackets. By this design, the frame 32 formed from any suitably rigid material, serves to maintain the auxiliary hood 11 releasably rigid in the expanded position which has been found to be an aid both when assembling the sun hood 11 and when taking pictures.

The operation of the reflex camera 10 with the auxiliary sun hood 11 is as follows:

Suppose that the reflex camera 10 is loaded and ready for taking pictures and that the known sun hood 11a is in the up position shown by the dot dash lines of Figure 3 with the hinged door 14 swung to the down position to close the opening 13 so that an image of some intensity may be seen on the ground-glass by looking through the open top of the known hood 11a, then the auxiliary sun hood 11 is expanded from the collapsed position shown in Figure 4 until the members 17 18, 19, and 20 are in the spaced parallel positions shown in Figures 1, 2, and 3. The lens 31 in the frame 32 is next inserted through the open top 21 of the auxiliary hood 11 and pushed downwardly to be supported along the upper edges of the brackets 27, 28, 29, and 30 which will maintain the auxiliary hood 11 releasably rigid in the expanded position. Next, the open bottom of the auxiliary hood 11 is inserted over the corresponding members of the known hood 11a, that is with the opening 22 of the hood 11 registering with the opening 13 of the known hood 11a and the opening 23 of the hood 11 registering with the opening 16 in the known hood 11a. Then, by looking downwardly through the open top 21 of the auxiliary hood 11 through the lens 31 a sharp image as picked up by the lens 12 will be seen on the ground-glass and by careful movement of the reflex camera 10 the object can be centered in the frame of the ground-glass to insure proper positioning on the film negative.

Further, suppose that the photographer rather than using ground-glass focusing desires to use eye frame focusing. By inserting the finger through the registered openings 22 and 13 against the door 14 the latter may be swung upwardly to the dot dash position shown in Figure 3 and out of the line of vision of the eye of the photographer placed in back of the opening 23 of the hood 11 to center the object in the frame of the registered openings 13 and 22. When the door 14 was swung inwardly and upwardly, the arm 26, flaring outwardly and inwardly from the shaft 24, was, unless in a position beyond the range thereof, also rotated counterclockwise (Fig. 3) toward the spaced front member 19.

Having taken the photograph using the previously mentioned eye frame focusing method, the photographer now wishes to use ground-glass focusing. By rotating the wheel 25 (Fig. 3) clockwise, the arm 26 carried by the common shaft 24 will also move clockwise against the inner surface of the door 14 forcing the door 14 downwardly and outwardly to close the opening 13 in the known hood 11a as well as the registered opening 22 in subject hood 11. Thus without removing the auxiliary hood 11 from the position shown in Figures 2 and 3, the photographer has available with slight effort both ground-glass and eye frame focusing.

It will be understood that the invention is not limited to the exact disclosure herein described but may lend itself to a variety of expressions within the scope of the appended claims. The invention is adapted for use with any reflex camera with a folding hood.

What is claimed is:

An auxiliary sun hood in combination with the open top collapsible sun hood of a reflex camera, the collapsible hood being provided with coacting openings of different size for eye frame focusing in a horizontal plane and a door releasably covering the larger opening for ground-glass focusing in a vertical plane, the door being hinged at the top of the larger opening and adapted to be rotated within the hood; the auxiliary sun hood comprising spaced parallel front and back members hingedly attached along corresponding edges, the top and bottom of the hood being open and the open bottom being adapted to be releasably secured over the open top of the collapsible hood, the front and back members having openings therethrough registering with corresponding openings in the collapsible hood; a shaft rotatably disposed through one of the side members of the auxiliary hood and above the openings, a handle member keyed to the outer end of the shaft, an arm keyed to the inner end of the shaft, the arm flaring inwardly and outwardly and adapted to press against the inner surface of the door; the auxiliary hood further comprising a lens, a frame for the lens releasably secured in the auxiliary hood in a horizontal plane above the registered openings and adapted to clarify the image on the ground-glass when viewed through the lens.

THOMAS A. DEVINE.

REFERENCES CITED

The following references are of record in the file of this patent:

UNITED STATES PATENTS

| Number | Name | Date |
|--------|------|------|
| 2,029,222 | Cree et al. | Jan. 28, 1936 |
| 2,054,442 | Percy | Sept. 15, 1936 |
| 2,180,013 | Milhalyi | Nov. 14, 1939 |
| 2,297,401 | Gabler et al. | Sept. 29, 1942 |